(12) United States Patent
Jones

(10) Patent No.: US 7,258,643 B2
(45) Date of Patent: Aug. 21, 2007

(54) DEVICE FOR ACTUATING A RECIPROCATING RECOVERY MEANS FOR UNDERGROUND FLUID

(75) Inventor: Dan Jones, Valley Mills, TX (US)

(73) Assignee: Epi-Energy, Ltd., Waco, TX (US)

( * ) Notice: Subject to any disclaimer, the term of this patent is extended or adjusted under 35 U.S.C. 154(b) by 408 days.

(21) Appl. No.: 10/963,104

(22) Filed: Oct. 12, 2004

(65) Prior Publication Data

US 2006/0076142 A1    Apr. 13, 2006

(51) Int. Cl.
*F16H 1/32* (2006.01)
*F16H 33/00* (2006.01)
*F16H 35/00* (2006.01)
*F16H 37/00* (2006.01)

(52) U.S. Cl. .................. 475/179; 475/170; 74/640
(58) Field of Classification Search ............... 740/640, 740/650; 475/179, 169, 170
See application file for complete search history.

(56) References Cited

U.S. PATENT DOCUMENTS

| | | | |
|---|---|---|---|
| 81,329 A | 8/1868 | Barden | |
| 107,432 A | 9/1870 | Zeigler | |
| 850,597 A | 4/1907 | McCanna | |
| 955,458 A | 4/1910 | Hampton | |
| 1,141,626 A | 6/1915 | Granville | |
| 1,270,950 A | 7/1918 | Johanson | |
| 1,538,008 A | 5/1925 | Sharkey | |
| 1,538,328 A | 5/1925 | Holdener | |
| 1,770,016 A | 7/1930 | Ruliancich | |
| 1,833,993 A | 12/1931 | Hill | |
| 2,475,504 A * | 7/1949 | Jackson | 475/179 |
| 3,037,400 A | 6/1962 | Sundt | |
| 3,043,164 A | 7/1962 | Sundt | |
| 3,668,947 A | 6/1972 | Waldorf | |
| 4,099,427 A | 7/1978 | Fickelscher | |
| 4,193,324 A | 3/1980 | Marc | |
| 4,227,422 A | 10/1980 | Kawashima | |
| 4,512,213 A * | 4/1985 | Newton | 475/179 |
| 5,292,289 A | 3/1994 | Ogata | |
| 5,324,240 A | 6/1994 | Guttinger | |
| 5,697,868 A * | 12/1997 | Akeel | 475/179 |
| 6,220,115 B1 | 4/2001 | Hirn | |
| 6,261,199 B1 * | 7/2001 | Schlangen | 475/163 |
| 6,280,359 B1 | 8/2001 | Moskob | |
| 6,336,881 B1 | 1/2002 | Rapp | |
| 6,428,437 B1 | 8/2002 | Schlanger | |
| 6,453,772 B1 | 9/2002 | Moskob | |
| 6,490,941 B1 | 12/2002 | Hur | |

OTHER PUBLICATIONS

U.S. Appl. No. 10/869,303, filed Jun. 16, 2004, Jones.
U.S. Appl. No. 10/945,529, filed Sep. 20, 2004, Jones.
Sumitomo Machinery Corporation of America, A Unique Concept in Speed Reducers & Gearmotors, 2002, United States.

* cited by examiner

*Primary Examiner*—Tisha Lewis
(74) *Attorney, Agent, or Firm*—Fulbright & Jaworski LLP

(57) ABSTRACT

A device for actuating a reciprocating recovery apparatus for recovery of underground fluid. The actuating device has a centrally aligned input component, that transversely receives an output component through a central aperture, and is engaged with a driving mechanism. Torque is increased about the central output component as a series of axially aligned, but centrally offset, lobes push a corresponding driver disc around the central output at reduced velocity and increased torque. Each driver disc moves in eccentric fashion, yet remains engaged with a corresponding, centrally aligned take off member, each of which is further in combination with the central output component.

3 Claims, 2 Drawing Sheets

DEVICE FOR ACTUATING A RECIPROCATING RECOVERY MEANS FOR UNDERGROUND FLUID

BACKGROUND OF THE INVENTION

1. Field of the Invention

The present invention generally relates to a device for actuating a reciprocating recovery means for recovery of underground fluid. In particular, the present invention relates to a device having an output that rotates with increased torque relative to its input. Torque is increased as a series of discs eccentrically move about a centrally aligned input and alternatingly engage an output. The eccentrically moving discs are engaged with centrally aligned components through a combination of seeded bearings, acting in concert to provide for an extremely efficient, exceptionally powerful system.

2. Background Information

Applicant's invention is envisioned as being particularly useful when placed in combination with a reciprocating recovery means, most likely a common "Pumpjack." That is, the present device is thought to present tremendous improvement when substituted for a standard gear box used in combination with a Pumpjack. The invention is particularly beneficial in that it eliminates the problems associated with known pumpjack actuating means. Namely, the present invention greatly improves the operating efficiency of a standard recovery means and reduces the mechanical inefficiencies associated with such recovery means.

Most commonly, underground fluid recovery is hindered by mechanical inefficiencies during operation. These inefficiencies are primarily a result of sliding part friction among component pieces and wear and tear of these pieces. Perhaps the single greatest source of efficiency loss is the standard gearbox used in combination with a Pumpjack. Typically, these gearboxes are driven by an electronic motor and have a "crank arm" extending to support a counterweight. The gearbox configuration is such that its rotation actuates the crank arm and the counterweight attached thereto between a top and bottom position. The gearbox is in combination with the Pumpjack itself though some connecting rod, so that as the crank arm, extending from the gearbox, actuates between a top and bottom position, the Pumpjack acuates accordingly in one-to-one fashion.

As a result of this configuration, gearboxes associated with standard Pumpjack operation are subject to tremendous stress. Eventually, these stresses wear down the gears within the gearbox. Once these gears wear down, a system breakdown is not far behind.

Applicant's invention provides a refreshing solution to the most common problems associated with standard gearbox-Pumpjack combinations. In fact, the device of the present invention eliminates the use of meshed gears all together. Rather, the torque required to actuate the Pumpjack is achieved though a series of eccentrically rotating discs, "driver discs." These discs are driven by a centrally aligned input member and alternatingly engage an output component, which rotates with reduced speed and increased torque. Internal components engage one another through some rollable means, such as bearings or dowels. Several bearings or dowels are simultaneously in contact with component parts and act in concert during device operation. As a result, sliding friction is virtually eliminated and the device's ability to withstand sheer or "shock" forces is tremendous.

First and foremost, the present device presents a tremendous increase in working efficiency. As mentioned, operation of the device involves a centrally aligned input member, driven by some electric motor means as known in the art. Through a novel combination of eccentrically moving discs, and the employment of radially aligned seeded bearings, a torque increase is achieve with virtually no sliding part friction. The output member is axially aligned with the input member to produce uniform rotation, and may be in connected to a typical crank arm-counterweight combination.

Applicant's device is very compact, yet tremendously powerful. The device achieves an amount of torque previously not possible in such a small space. As a result, the device may easily be substituted for any standard gearbox without undue burden. With use of the present device, a super-linear increase in torque is achieved with only a linear increase in size. That is, torque increases with the square of the radius of the device. As such, a tremendous torque increase can be achieved with only a minimal increase in "footprint."

In addition, the device of the present invention is mechanically efficient. Through use of only "rolling" components, sliding friction is virtually eliminated. As these rolling components are symmetrically aligned, and are simultaneously in contact with one another, sheer or "shock" forces are distributed evenly among the component pieces. These attributes, alone and in combination, greatly reduce operating energy, heat production, and wear and tear. Finally, operating life of the device is increased by virtue of the efficient rotation interface between the central member and driver discs, and the output component.

Applicant's invention is extremely cost effective. Because of the mechanically efficient nature of, and the even distribution of sheer forces within, the system component pieces can be made of standard grade materials. Also, the current device is the product of a straightforward manufacturing process. The manufacturing cost associated with the present device is on the order of a thousand dollars, which represents a tremendous saving in view of the tens of thousands of dollars spent on typical gearboxes. Finally, as will be further discussed, the primary components of the present device may be laminated. This characteristic allows for a much cheaper and faster production process.

In view of the limitations of known products, there is a great need for a device for actuating a reciprocating recovery means for recovery of underground fluid that is compact, powerful, friction-free, durable, mechanically efficient, and cost-effective. Applicant's invention, by its novel design and straightforward manufacture process, provides an improvement in view of currently available products.

SUMMARY OF THE INVENTION

In view of the foregoing, it is an object of the present invention to provide a device for actuating a reciprocating recovery means for recovery of underground fluid that has a tremendous torque/size ratio.

It is another object of the present invention to provide a device for actuating a reciprocating recovery means for recovery of underground fluid that is very compact.

It is another object of the present invention to provide a device for actuating a reciprocating recovery means for recovery of underground fluid that is tremendously powerful.

It is another object of the present invention to provide a device for actuating a reciprocating recovery means for recovery of underground fluid that has an excellent power to weight ratio.

It is another object of the present invention to provide a device for actuating a reciprocating recovery means for recovery of underground fluid that is exceptionally mechanically efficient.

It is another object of the present invention to provide a device for actuating a reciprocating recovery means for recovery of underground fluid that is highly cost-effective.

It is another object of the present invention to provide a device for actuating a reciprocating recovery means for recovery of underground fluid that is extremely durable.

It is another object of the present invention to provide a device for actuating a reciprocating recovery means for recovery of underground fluid having a straightforward manufacturing process.

It is another object of the present invention to provide a device for actuating a reciprocating recovery means for recovery of underground fluid that can withstand extreme lateral or sheer forces.

It is yet another object of the present invention to provide a device for actuating a reciprocating recovery means for recovery of underground fluid that has exceptionally low internal friction.

It is an object of the present invention to provide a device for actuating a reciprocating recovery means for recovery of underground fluid where the rotational direction of the low speed shaft is the opposite from the rotational direction of the high speed shaft.

In satisfaction of these and other related objectives, Applicant's present invention provides a device for actuating a reciprocating recovery means for recovery of underground fluid. This invention is thought to be most beneficial in replacing a standard gearbox used in combination with, and to drive, a standard Pumpjack. Rather than relying on meshed gears, the present invention incorporates only rolling parts to increase torque along an output. Operation of the device commences as an input member is driven by some outside power source. Typically, this power source would be an electric motor means-belt combination as known in the art. The output component drives a crank arm to actuate the Pumpjack.

As with all primary components of the present device, the input member is axially aligned with the output member so as to share a common axis of rotation. In its preferred form, the input member is a radial disc, having a central aperture, and positioned approximately about the lengthwise midpoint of the output member. At its approximate lengthwise midpoint, the output members is surrounded by the input member where the output member traverses the central aperture of the input disc member. As will be further discussed, there is sufficient clearance between the output member and the input member, so that each freely rotates with respect to the other. In addition, other useful embodiments are envisioned where the input member is driven by some gear member, such as a worm gear.

An eccentric lobe is positioned on either side of the input member so that the input member is effectively sandwiched between each eccentric lobe. These eccentric lobes are affixed to the input member (usually by a series of pins or screws) so that each shares the rotational velocity of the input member. These eccentric lobes are axially aligned, but centrally offset, with respect to the output shaft member. Surrounding each eccentric lobe is a driver disc. Each driver disc is engaged with a corresponding eccentric lobe so that as the input member and eccentric lobes rotate, each driver disc sweeps out eccentric rings about the input member. Each driver disc is so spaced from each eccentric lobe so that a series of ball bearings fits between the lobe and disc to allow effective rotation of each part. By virtue of the offset configuration, as each eccentric lobe rotates, each driver disc is "pushed" in the opposite direction, albeit at a reduced speed.

Each driver disc is further engaged with a corresponding take off member through a series of embedded bearings. These bearings are contained within hemispherical apertures within each driver disc and each take off member. These hemispherical apertures are of a diameter equal to the sum of the bearing diameter and the offset of the eccentric lobe. Such an engagement allows each take off member to remain engaged with, and share the rotational velocity of, each eccentrically moving driver disc while remaining centrally aligned with remaining component parts (e.g., the output member). Further, each take off member is affixed to the output member so that each part has the same rotational velocity. As each take off member and output member rotate, they are separated from other components parts (namely, the input member and outer radial shell) by some rotations means such as rolling pins or bearings.

By virtue of their eccentric motion, each driver disc alternatingly engages an outer radial shell at diametrically opposite locations along the shell. The outer radial shell is aligned with, and substantially covers the driver discs and output member. Also, the outer radial shell has an aperture sized to allow a drive mechanism to extend between the input member and the driving source. The outer radial shell is engaged with other components parts (namely, each driver disc and take off member) through some rotation means such as bearings or rolling pins. This arrangement allows other components to freely rotate within the outer radial shell. Finally, during operation, the outer radial shell remains fixed with respect to the surrounding environment and so provides a point by which the device may be secured.

The output component rotates in the opposite direction of, with reduced rotational velocity, and with a corresponding increase in torque with respect to the input component. Such is the result as the driver discs eccentrically "sweep around" the input component and eccentric lobes in an opposite direction. This eccentric rotation corresponds to reduction in rotational velocity, and an increase in torque, that is shared by the output member.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
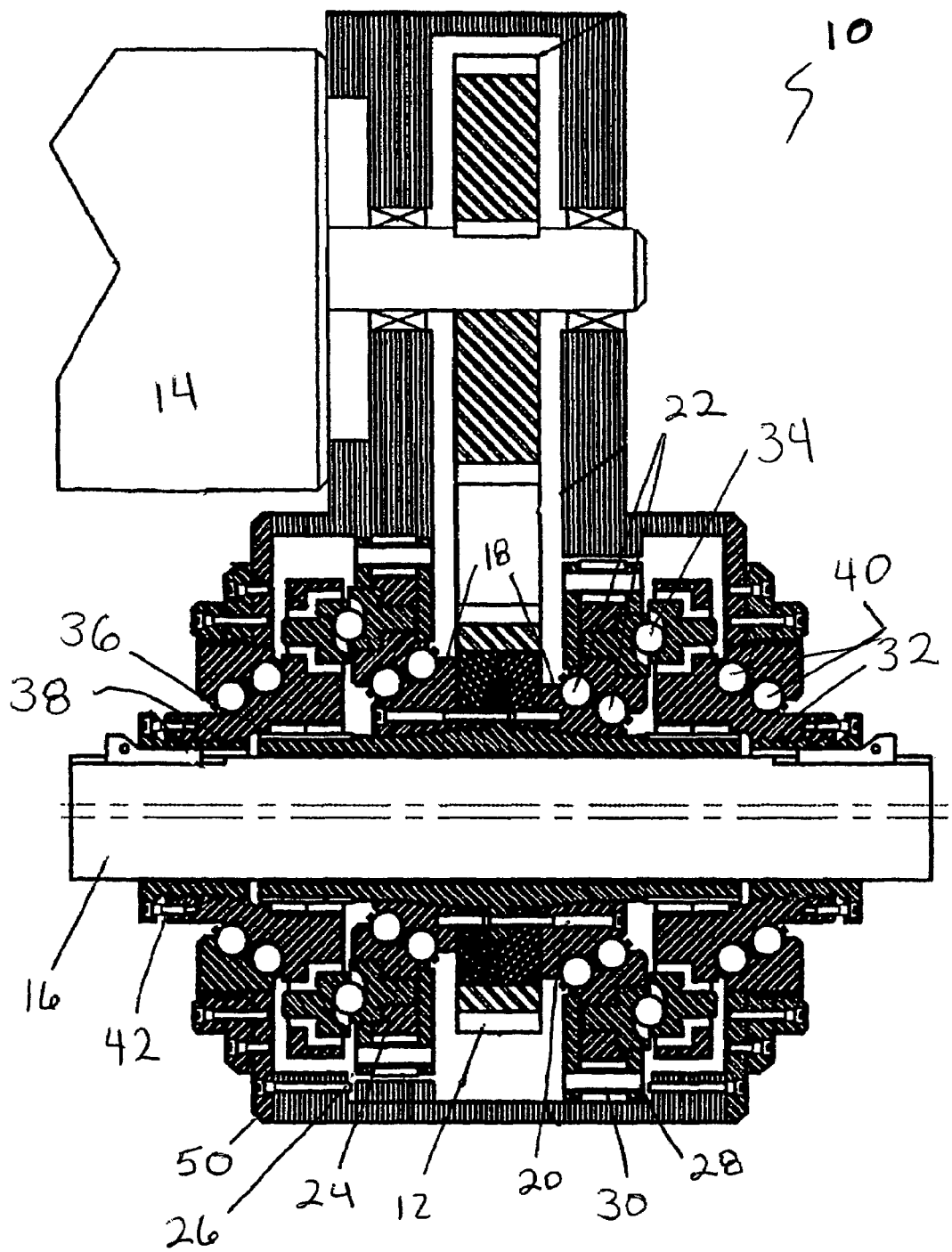
FIG. 1 is a cross sectional view of the device of the present invention.

Referring to FIG. 1, a device for actuating a reciprocating recovery means for recovery of underground fluid is shown, and is generally designated by numeral 10. In the preferred embodiment, the primary components of the device are laminated. That is, each component is comprised of a series of relatively thin pieces of source material. These pieces are cut individually and then sandwiched together to form the final primary components. Production by way of lamination greatly reduces production costs and increases production speed. Specifically, it is much easier and cheaper to cut several thin pieces and fit them together, rather than cutting a single thick piece to form a single component.

A best seen in FIG. 1, apparatus 10 contains input member 12. In the preferred embodiment, input member 12 is a radial disc having a central aperture defined by the inner circumference of input member 12. In the preferred embodiment, input member 12 is centrally, axially aligned with output member 16 and is located about the approximate lengthwise midpoint of output member 16. Output member 16 traverses input member 12 through its central aperture.

During operation, input member 12 is driven by some motor means 14 as known in the art. Usually, motor means 14 drives input member 12 through some attachment, such as a drive belt (not shown). However, other useful embodiments are envisioned where input member 12 is a mechanism configured to be driven by some gear means, such as a worm gear.

An eccentric lobe 18 is positioned on either side of input member 12 so that input member 12 is effectively sandwiched between each lobe 18. Each lobe 18 is axially aligned, but centrally offset, from input member 12 and output member 16. Specifically, lobes 18 are configured so that one lobe 18 is offset from input member 12 and output member 16 in one direction, and the other lobe 18 is offset from input member 12 and output member 16 by the same amount, in the diametrically opposite direction.

Input 12 is affixed to each lobe 18 by some affixing means 20 so that each share the same rotational velocity. In the preferred embodiment, affixing means 20 is a simple screw or pin combination wherein one or more screws or pins traverses each member. During operation, as input 12 and lobes 18 rotate, lobes 18 eccentrically "sweep around" output 16.

As best seen in FIG. 1, each eccentric lobe 18 is configured to receive and hold eccentric lobe bearings 22. Along their outer circumference, eccentric lobes 18 have grooves sized to allow eccentric lobe bearings 22 to remain embedded along the outer circumference of eccentric lobes 18, and freely rotate within those grooves.

Referring principally to FIG. 1, a driver disc 24 of generally circular disc shape, surrounds each eccentric lobe 18 and is engaged with such through eccentric lobe bearings 22. Each driver disc 24 is spaced from each eccentric lobe 18 so that eccentric lobe bearings 22 fit between each driver disc 24 and each eccentric lobe 18. Eccentric lobe bearings 22 allow each eccentric lobe 18 to rotate within each driver disc 24, while each driver disc remains centrally aligned with respect to its corresponding eccentric lobe. Importantly, as each lobe 18 eccentrically sweeps around output member 16, each disc 24 is pushed in the opposite direction. As such, each disc 24 rotates with reduced speed and a corresponding increase in torque. Finally, this speed reduction/torque increase is transferred to output member 16 via each take off member 32.

Outer shell 50 acts as a housing for the primary components of device 10; that is, outer shell 50 is aligned with, and substantially covers, the driver discs 24 and output member 16. Also, outer radial shell 50 has a central aperture sized to allow some drive mechanism (typically some gear or belt) to extend between input member 12 and motor means 14. Outer radial shell 50 is engaged with other components parts through some rotation means such as bearings or rolling pins. Specifically, shell 50 is engaged with each driver disc 24 through driver disc engagement means 26, and, is engaged with take off member 32 through take off member rolling means 40. This arrangement allows other components to freely rotate within outer radial shell 50. Finally, during operation, outer radial shell 50 remains fixed with respect to the surrounding environment and so provides a point by which device 10 may be secured.

As input member 12 and eccentric lobe 18 rotate while outer shell 50 is held fixed, each driver disc 24 sweeps out eccentric circles all the while moving in the opposite direction of eccentric lobes 18. Rotational speed reduction occurs as each driver disc 24 does not rotate with each lobe 18, but rather is "pushed" around their eccentric path. As each driver disc 24 moves about output member 16 in eccentric fashion, each disc 24 engages outer shell 50 at diametrically opposite points. Further, the interaction is such that engagement means 26 alternatingly engages shell 50, and then "pushes" each disc 24 past it initial engagement point. As such, radial shell 50 may have some receiving means comprising a series of radially aligned teeth and groove combinations configured to alternately receive engagement means 26.

As mentioned, each driver disc 24 contains a driver disc engagement means 26 along their outer circumference. By virtue of their eccentric motion, each driver disc 24 alternatingly engages an outer radial shell 50. Engagement means 26 allows each driver disc 24 to freely move within outer radial shell 50. In the preferred embodiment, engagement means 26 consists of a series of semicircular grooves and protrusions uniformly spaced along the outer circumference of driver disc 24. These grooves and protrusions are alternatingly arranged around each disc in groove-protrusion, groove protrusion fashion. Semicircular protrusions further contain protrusion apertures, through which dowels 28 are inserted. Dowels 28 serve to centrally align rollers 30 within the protrusions. Rollers 30 are fitted between the protrusions and are held in alignment as they rotate about dowels 28. There are several advantages associated with using rollers. For instance, during operation, several rollers are simultaneously in contact (to varying degrees) with outer radial shell 50. As such, sheer strength of device 10 is increased as any such sheer or "shock" force would be distributed evenly among all of the rollers 30 simultaneously in contact with outer shell 50. Moreover, by virtue of the sinusoidal configuration of the protrusions and grooves, and the "sweeping motion" of each disc 24, each roller 30 undergoes minimal rotation during engagement with output shell 50. This reduces operating friction and increases working life of component pieces. Other useful alternative embodiments are thought to incorporate different engagement means 26. For example, engagement means 26 could be a series of engagement dowels along each disc 24 outer circumferences, embedded so that a half-circumference of each dowel is contained within each driver disc and the other half-circumference protrudes from the driver disc in half-circle fashion. Similar to the preferred embodiment, these engagement dowels engage or "grab" outer radial shell 50 as each driver disc 24 rotates. Finally, useful embodiments are envisioned where a series of aligned bearings fit between each disc 24 and outer shell 50. It is easily seen that such an arrangement would further allow preferred operation of device 10.

As best seen in FIG. 1, in the preferred embodiment, each roller 30 fits within a protrusion and is primarily responsible for reversibly engaging with outer radial shell 50. Outer radial shell 50, along its inner circumference, contains an outer shell receiving means. Such an outer shell receiving means would be configured according to the particular embodiment of engagement means 26. However, in the preferred embodiment, such comprises a series of uniformly spaced sinusoidal grooves and protrusions. These grooves and protrusions are alternatingly arranged along outer shell

50 in groove-protrusion, groove protrusion fashion and are configured so that grooves within each disc 24 receive protrusions extending from shell 50, and protrusions extending from each disc 24 are received by grooves within radial shell 50.

As best seen in FIG. 1, each driver disc 24 and each take off member 32 interface with one another through a series of radially aligned take off member bearings 34. Driver disc 24 and take off member 32 each contain radially aligned hemispherical bearing slots to hold bearings 34. These bearing slots receive and hold take off member bearings 34 such that one half of each bearing 34 is contained within each member. As each disc 24 and each take off member 32 contain one half of a bearing 34 therein, each is engaged with the other in a low-friction environment. As these components undergo their relative motion, bearings 34 simply roll along the inside of the slots. By virtue of this "ball drive" configuration, bearings 34 act in unison to smoothly transfer power among the components. Further, any force exerted upon device 10 is evenly distributed among all bearings 34; as such, the ball drive configuration provides for an incredibly powerful and efficient torque increase mechanism.

In the preferred embodiment, the diameter of each bearing slot holding bearings 34 is equal to the diameter of each bearing 34 and the eccentricity of eccentric lobe 18. Such an arrangement allows for each driver disc 24 to rotate about output member 16 in eccentric fashion, having their respective center points offset from such by engagement with lobe 18, and remain engaged with a take off member 32. While the bearing-type interface between disc 24 and member 32 provides for exceptional performance with regard to elimination of friction and sheer force distribution, this interface is not an exclusive one.

Figure 2:
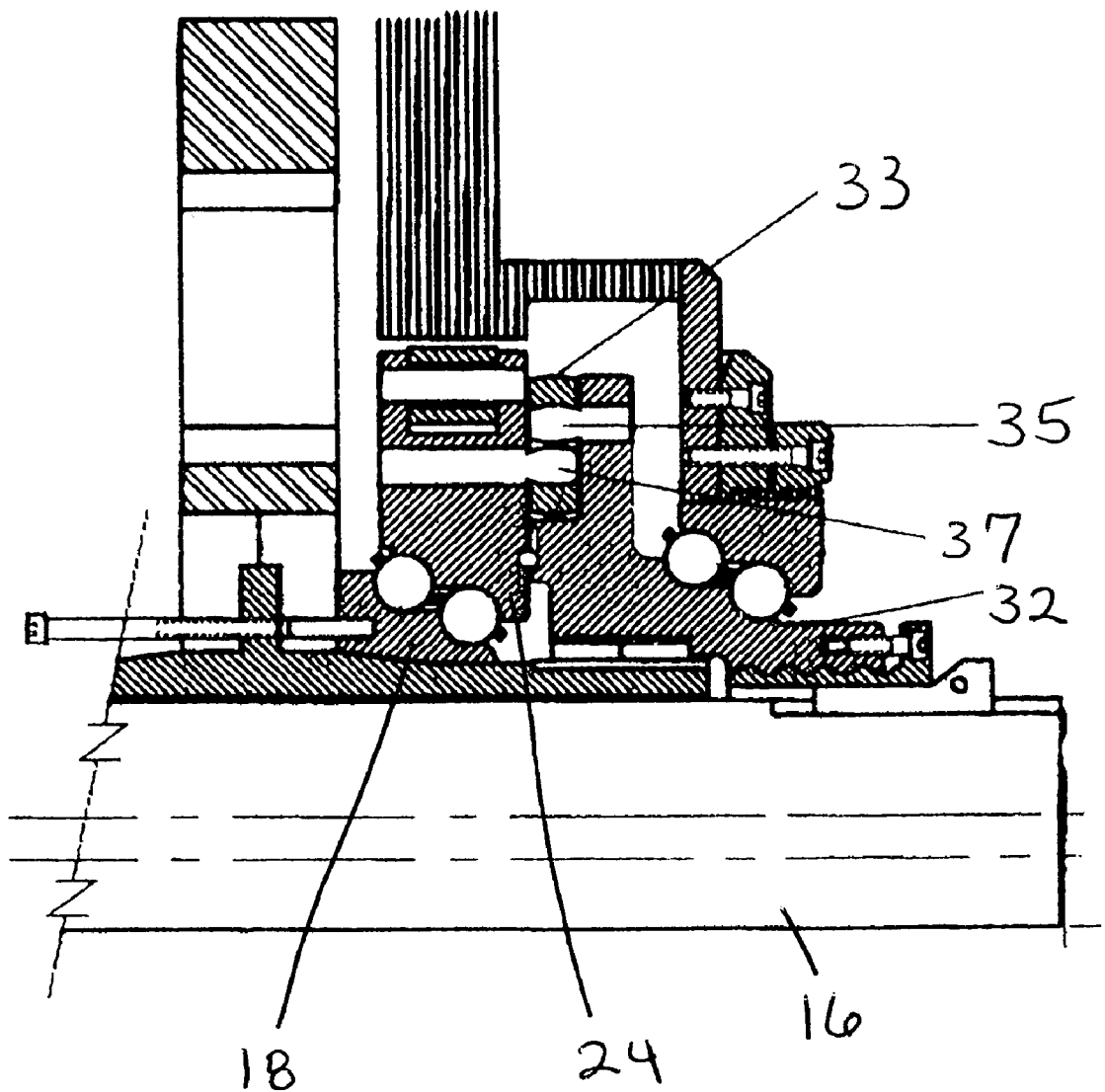
FIG. 2 is a partial, cross-sectional view of an alternate embodiment of the present invention.

Other useful embodiments are envisioned where disc 24 and member 32 interface with one another through a dowel and ring combination as seen in FIG. 2. In such an embodiment a series of radially aligned rings 33 is sandwiched between each of the components. Each ring 33 receives a dowel 35,37 along its inner circumference from each component. As disc 24 and member 32 undergo their relative motion, dowel 35,37 from each of the components roll along the inner circumference of the sandwiched rings 33. In this embodiment, the diameter of each ring 33 is equal to the diameter of a dowel 35,37 and the lobe eccentricity. Such an arrangement allows for each driver disc 24 to move about input member 12 in eccentric fashion and remain engaged with centrally aligned take off member 32. Moreover, in this embodiment, the inner circumference of each ring 33 is grooved, and the distal portions of each dowel 35,37 are ball-shaped. Such a configuration allows disc 24 and member 32 to rotate on either side of a sandwiched ring 33, without surface contact between the components. Rather, each dowel 35,37 fits within the groove of each ring 33 so as to prevent any surface-to-surface friction among disc 24, member 32, and each ring 33. As mentioned, each take off member 32 is centrally aligned with output member 16. Further, each member 32, by virtue of its engagement with driver disc 24, rotates at reduced speed and in the opposite direction with respect to input member 12 and each eccentric lobe 18. Output member 16 and each take off member 32 are affixed to one another so that each shares the same rotational velocity. As seen in FIG. 1, in the preferred embodiment, member 16 and each member 32 are affixed to one another by output member affixing means 42. In the preferred embodiment, affixing means 42 may simply be a combination of pins or screws that traverse each component. Also, as best seen in FIG. 1, member 16 and each member 32 further have a sinusoidal interface 38, that further imparts structural integrity to device 10 during operation.

Input member rolling means 36 is contained between input member 12 and each take off member 32. Rolling means 36 serves as an interface between input member 12 and each take off member 32, and allows for opposite rotation there between. Finally, each take off member 32 is allowed to freely rotate within outer radial shell 50 by virtue of take off member rolling means 40. In the preferred embodiment, rolling means 40 is a series of bearings arranged between each member 32 and shell 50. However, other useful embodiments are envisioned where rolling means 40 is of rolling pin or dowel combination of the general nature as those described above.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A device for actuation a reciprocating recovery means for recovery of underground fluid, comprising:
    an input component, where said input component is configured for receiving and engaging a driving mechanism;
    one or more lobes, where said one or more lobes are adjacently positioned with respect to said input component, where each of said one or more lobes is axially aligned, but centrally offset, from said input component and an output component, and each of said one or more lobes being rotationally coupled with said input component so that each of said one or more lobes and said input component share the same rotational speed;
    one or more driver discs, wherein each of said one or more driver discs being engaged with said input component through one of said one or more lobes wherein each of said one or more discs is centrally, axially aligned about one of said one or more lobes, where each of said one or more discs move about said input component in eccentric fashion with reduced speed, responding to rotational force applied to said input component by said driving mechanism via said one or more lobes;
    one or more take off members, each of said one or more take off members engaged with one of said one or more driver discs such that each rotates about said input component with the same speed, where each of said one or more take off members is centrally, axially aligned with said output member and rotationally coupled with such so that each of said one or more take off members and said output component share the same reduced rotational velocity; and
    a housing, where said housing substantially covers said input component, said output component, said one or more lobes, said one or more driver discs, and said one or more take off members, where said housing is engaged with said one or more take off members such that each may freely rotate within said housing, where said one or more driver discs engage said housing via a plurality of roller mechanisms, and where said housing is configured to remain fixed with respect to the surrounding environment of said device.

2. A device for actuation a reciprocating recovery means for recovery of underground fluid, comprising:
- an input component, where said input component is configured for receiving and engaging a driving mechanism;
- one or more lobes, where said one or more lobes are adjacently positioned with respect to said input component, where each of said one or more lobes is axially aligned, but centrally offset, from said input component and an output component, and each of said one or more lobes being rotationally coupled with said input component so that each of said one or more lobes and said input component share the same rotational speed;
- one or more driver discs, wherein each of said one or more driver discs being engaged with said input component through one of said one or more lobes, wherein each of said one or more discs is centrally, axially aligned about one of said one or more lobes, where each of said one or more discs move about said input component in eccentric fashion with reduced speed, responding to rotational force applied to said input component by said driving mechanism via said one or more lobes;
- one or more take off members, each of said one or more take off members engaged with one of said one or more driver discs such that each rotates about said input component with the same speed, wherein said one or more driver discs and said one or more take off members are engaged with one another through a series of loosely seated bearings, said bearings being partially seated within each driver disc and each take off member, and where each of said one or more take off members is centrally, axially aligned with said output member and rotationally coupled with such so that each of said one or more take off members and said output component share the same reduced rotational velocity; and
- a housing, where said housing substantially covers said input component, said output component, said one or more lobes, said one or more driver discs, and said one or more take off members, where said housing is engaged with said one or more take off members such that each may freely rotate within said housing, and where said housing is configured to remain fixed with respect to the surrounding environment of said device.

3. A device for actuation a reciprocating recovery means for recovery of underground fluid, comprising:
- an input component, where said input component is configured for receiving and engaging a driving mechanism;
- one or more lobes, where said one or more lobes are adjacently positioned with respect to said input component, where each of said one or more lobes is axially aligned, but centrally offset, from said input component and an output component, and each of said one or more lobes being rotationally coupled with said input component so that each of said one or more lobes and said input component share the same rotational speed;
- one or more driver discs, wherein each of said one or more driver discs being engaged with said input component through one of said one or more lobes, wherein each of said one or more discs is centrally, axially aligned about one of said one or more lobes, where each of said one or more discs move about said input component in eccentric fashion with reduced speed, responding to rotational force applied to said input component by said driving mechanism via said one or more lobes;
- one or more take off members, each of said one or more take off members engaged with one of said one or more driver discs such that each rotates about said input component with the same speed, wherein said one or more driver discs and said one or more take off members are engaged with one another through a combination of dowels and rings where said dowels protruding from each of said one or more driver discs and each of said one or more take off members engage each of said rings at diametrically opposite locations along said ring, and where each of said dowels revolve along said ring as said driver disc moves about said input component, and where each of said one or more take off members is centrally, axially aligned with said output member and rotationally coupled with such so that each of said one or more take off members and said output component share the same reduced rotational velocity; and
- a housing, where said housing substantially covers said input component, said output component, said one or more lobes, said one or more driver discs, and said one or more take off members, where said housing is engaged with said one or more take off members such that each may freely rotate within said housing, and where said housing is configured to remain fixed with respect to the surrounding environment of said device.

* * * * *